(12) United States Patent
Gill

(10) Patent No.: US 6,283,686 B1
(45) Date of Patent: Sep. 4, 2001

(54) SUPPORTING AND CENTERING DEVICE FOR USE IN THE PRODUCTION OF DOUBLE-TOOTHING SPROCKET WHEELS OR PULLEYS AND METHOD OF USING SAME

(75) Inventor: Sheridan Ralph Gill, Sark (GB)

(73) Assignee: Technologies Research Holding S.A., Rue Glesener (LU)

(*) Notice: Subject to any disclaimer, the term of this patent is extended or adjusted under 35 U.S.C. 154(b) by 0 days.

(21) Appl. No.: 09/568,896

(22) Filed: May 11, 2000

Related U.S. Application Data

(63) Continuation of application No. PCT/GB98/03301, filed on Nov. 4, 1998.

(30) Foreign Application Priority Data

Nov. 12, 1997 (GB) .................................................. 9723917

(51) Int. Cl.⁷ .................................................. B23F 23/08
(52) U.S. Cl. .................................................. 409/26; 33/628; 33/638; 33/641; 279/136; 409/61; 409/34; 409/62; 409/42
(58) Field of Search .................................. 409/31, 33, 34, 409/37, 42, 46, 58, 62, 26, 61; 33/628, 633, 638, 641; 279/136; 451/410, 414

(56) References Cited

U.S. PATENT DOCUMENTS

| | | | |
|---|---|---|---|
| 1,021,011 | * | 3/1912 | Sponable .............................. 279/136 |
| 1,998,835 | | 4/1935 | Fellows . |
| 2,106,212 | * | 1/1938 | Halborg ................................ 409/62 |
| 3,212,404 | * | 10/1965 | Becher ................................. 409/34 |

FOREIGN PATENT DOCUMENTS

| | | | |
|---|---|---|---|
| 27 17 517 A1 | | 10/1978 | (DE) . |
| 144218 | * | 10/1980 | (DE) ..................................... 409/34 |
| 1000981 | | 1/1969 | (GB) . |
| 844142 | * | 7/1981 | (SU) ................................... 279/136 |

* cited by examiner

Primary Examiner—Daniel W. Howell
(74) Attorney, Agent, or Firm—Akin, Gump, Strauss, Hauer & Feld, L.L.P.

(57) ABSTRACT

Centering device acting upon an already present first ring (14a) of a straight or double helical toothing of gears, sprocket wheels or pulleys to obtain the second ring (14b) of the toothing generated by a pinion shaped cutter (16), a central groove (19) separating said first ring and said second ring. The centering device comprising a retractable pin (20, 120), cooperating during the positioning step of the gear (13), with at least a tooth (15) of the first ring (14a), having a first waiting position (20a, 120a) and a second operating position (20b, 120b) defining the angular position of the gear (13) clamped on the rotary supporting base (18), the angular position being functionally correlated to the plane which contains the axis (25) of the gear (11) and the axis (26) of the cutter (16).

17 Claims, 3 Drawing Sheets

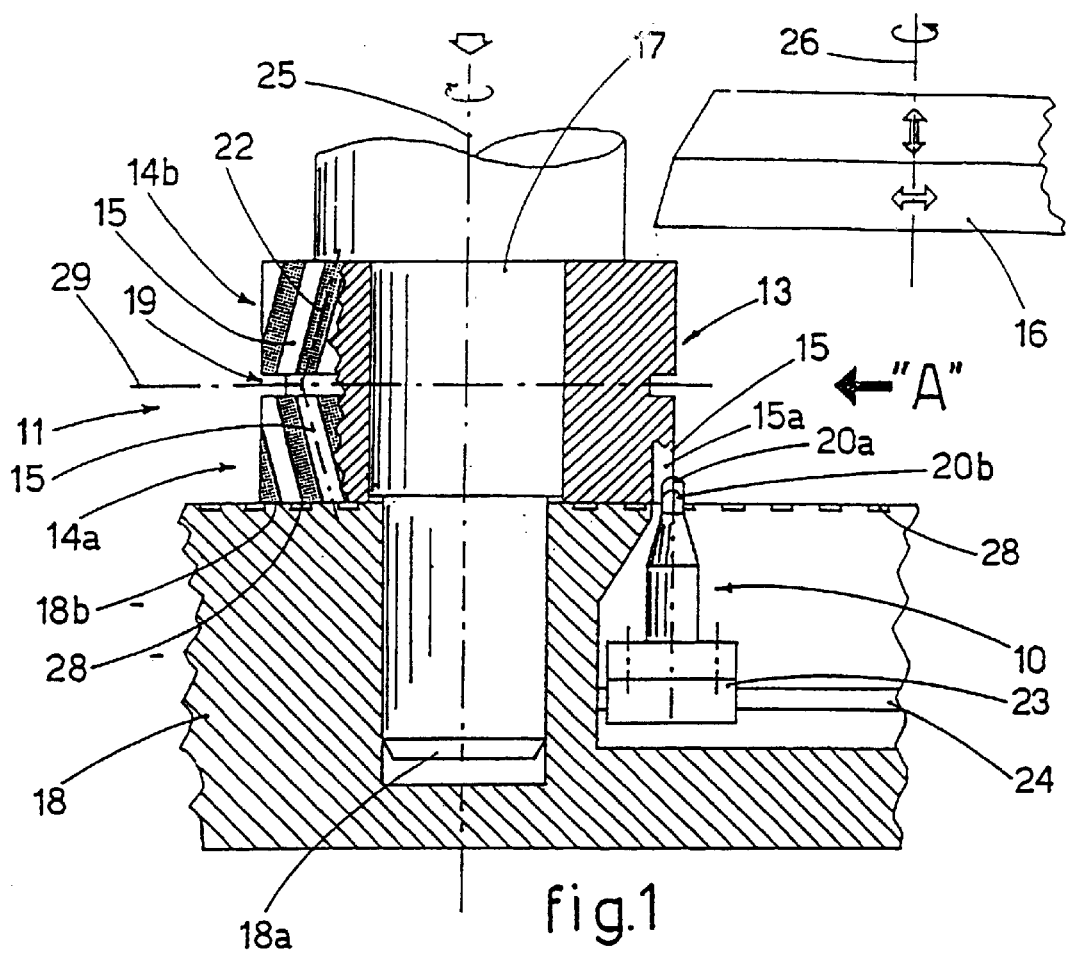
fig.1
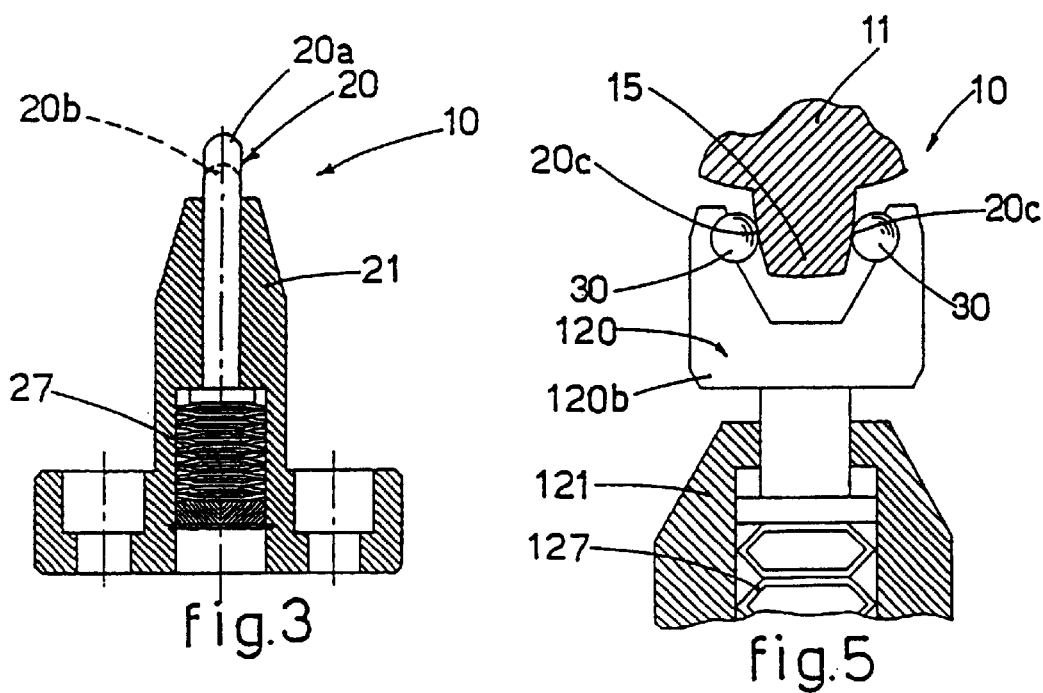
fig.3
fig.5

SUPPORTING AND CENTERING DEVICE FOR USE IN THE PRODUCTION OF DOUBLE-TOOTHING SPROCKET WHEELS OR PULLEYS AND METHOD OF USING SAME

CROSS REFERENCE TO RELATED APPLICATION

This Application is a continuation of International Application PCT/GB98/03301, filed Nov. 4, 1998, the disclosure of which is incorporated herein by reference.

BACKGROUND OF THE INVENTION

This invention concerns a supporting and centering device for use in the production of double-toothing sprocket wheels or pulleys and method of using same.

The sprocket wheels or pulleys to which the invention refers include a central groove which separates the two toothed rings and whose teeth are usually inclined from 2° to 60°, but can be straight. The sprocket wheels or pulleys to which the invention refers are advantageously of the type used together with the so-called positive drive belts such as those produced by the Goodyear Company and known by the trade name of "EAGLE".

The invention seeks to enable sprocket wheels to be produced using generating blades or pinion instruments which move along an axis parallel to the axis of the sprocket wheel and rotate in coordination therewith, both in the forward and in the return movement, the axes being perpendicular to the plane of the workpiece-bearing table. The sprocket wheels to which the invention relates may include teeth which coincide with respect to the center line or are offset, the offset distance being advantageously 50% of the pitch.

The invention is used to correctly position a workpiece in order to obtain the desired reciprocal positioning of the two mating rings of teeth of the sprocket wheel. The state of the art covers sprocket wheels with a straight or bi-helical double-toothing. Reference is made, for example, to DE-A1-2717515 where one positioning method for carrying out toothing is described. The wheels comprise two coaxial rings of oblique and converging teeth, arranged substantially symmetrically with respect to an intermediate plane of separation, in a substantially herringbone design. Double-toothing wheels are normally worked by positioning and clamping a workpiece and subsequently activating a generating blade or cutting instrument to act on the periphery of the workpiece. Depending on the shape of the teeth, the sprocket wheels may be used to transmit movement by means of positive drive belts.

On the one hand it is not normally possible to work small double-toothing wheels on a large scale with machines having a single positioning, and on the other hand such a machine involves prohibitive production costs and low productivity. There have also been proposals to work the double-toothing sprocket wheels using machines with a supporting base or workpiece-bearing table and with a generating blade or pinion instrument cutting tool which works with a to-and-fro movement parallel to the axis of the piece and rotates at the same time in a coordinated manner with the piece to be worked.

In this case the unworked workpiece is placed with its axis vertical and associated with a shaft, cooperating with the supporting base or piece-bearing table, which determines the starting position with respect to the position of the generating blade or pinion instrument. In this procedure, two rings of teeth are made in two successive steps; the first step leads to formation of teeth on a first ring and the second step is for formation of the teeth on the other ring.

However, with this procedure there is the problem of correctly positioning the workpiece on the machine for the second ring of teeth to be made so as to achieve the precise respective positions of the first and second ring of teeth. It should be noted that in order to obtain a satisfactory result the axes of the teeth must necessarily meet along the center line of the sprocket wheel within extremely limited tolerances.

The play in the connection between the workpiece to be worked and the shaft which clamps the workpiece to the supporting base makes it even more difficult to achieve the correct positioning. Therefore it becomes necessary to carry out long and complex operations to adapt the position of the generating blade or pinion instrument with respect to the workpiece and vice versa, according to data and measurements monitored by specific equipment.

Also with this method, the cost of production of the sprocket wheels is very high and one of the reasons for this is simply because of the additional operations of removing the shavings.

The smaller the sprocket wheel to be made, the greater the problem; even though it is possible to achieve larger sprocket wheels with a sufficient degree of precision, and with overall production times which are reasonable with respect to the total cutting time, until now it has been practically impossible to make small sprocket wheels of this type with any guarantee of reliability and at reasonable cost.

An object of the invention is to achieve a device which will allow the precise positioning and centering of the workpieces required for producing a second ring of teeth in the production of double-toothing sprocket wheels.

SUMMARY OF THE INVENTION

Another object of the invention is to obtain the precise positioning of the teeth of the second ring with respect to the teeth of the first ring cheaply and in a short time.

A further object is to provide a simple, functional device which will allow the workpiece to form the sprocket wheel to be centered precisely with respect to a cutting blade or pinion instrument, and which will allow the correlated centered position to be maintained throughout the working step.

The invention is set forth and characterised in the respective independent claims, while the dependent claims describe other characteristics of the idea of the main embodiment.

The invention is applied to production of double-toothing sprocket wheels generated typically by generating blades or pinion instruments.

This invention also provides a method of producing double-toothing sprocket wheels which will allow a drastic reduction in the time required to center and correctly position the workpiece and therefore, more generally, reduce the times and costs of production, while at the same time guaranteeing extreme precision and reliability even for smaller sprocket wheels.

The centering device according to the invention operates in association with the shaft of the supporting base of the workpiece to be worked and is placed, for any size of sprocket wheel, in a pre-set position with respect to the start-of-work position of the blade device or pinion instrument. The device cooperates with any tooth, or with any pair of teeth, of the first ring of teeth.

The pre-set position is correlated to the extent of the desired staggering, or alignment, of the teeth of the first and second ring of the sprocket wheel.

The centering device comprises at least one retractable pin arranged with its axis substantially parallel to the axis of rotation of the sprocket wheel and cooperating with the separating grooves between the teeth of the first ring of the sprocket wheel which is to be made.

According to one variant, the centering device has a fork element which cooperates with a tooth of the first ring.

According to another variant, the pin or fork element cooperates with the groove, or with two teeth, substantially along the pitch circle of the teeth.

Hereinafter, for simplicity of explanation, we shall describe only the situation with the retractable pin, but the situation with the fork element cooperating with a tooth shall be considered equivalent thereto.

According to the invention, the retractable pin can assume at least a first position, or waiting position, wherein it is arranged in a high position above the support surface of the supporting base and a second position, or operating position, wherein it cooperates with two teeth of the first ring, then protruding to a small extent from the said surface.

According to a variant, the retractable pin cooperates with spring means which is able, when compressed or released, to define respectively the waiting position or the operating position.

The centering device is kinematically connected to the supporting base so that it rotates together with the base, with the sprocket wheel and possibly with the axial positioning and clamping shaft; the sprocket wheel is mounted coaxially with respect to the base and the shaft.

According to another variant, the position of the centering device with respect to the axis of rotation of the workpiece can be adjusted according to the diameter of the sprocket wheel which is to be made.

According to the invention, after the first ring of teeth has been made, the workpiece is positioned at a work station so that the second ring may be made, the first ring being arranged so as to cooperate with the supporting base.

In this condition, the retractable pin of the centering device is in the waiting position and is then inserted into a groove separating two teeth of the first ring; then the axial positioning and clamping shaft is applied, which thereby centering the sprocket wheel with respect to the supporting base and at the same time clamping it with respect thereto. When the sprocket wheel is clamped onto the supporting base, the centering device is in the operating position.

The contact between the retractable pin and the walls of the teeth between which it is inserted during the clamping step causes a possible adjustment rotation of the sprocket wheel with respect to the axis of rotation. This causes the pair of teeth to be correctly positioned with respect to the generating device or pinion instrument.

As work progresses in making the second ring, the centering device, since it is fixed to the base, moves together with the sprocket wheel, the supporting base and possibly also the axial positioning and clamping shaft, thus maintaining the workpiece in the correct position for the duration of the whole operation.

According to a variant, the retractable pin of the centering device is placed orthogonal to the axis of rotation of the sprocket wheel.

According to a further variant, the centering device comprises an auxiliary centering element which is arranged, during the initial equipping and preparation step, above the supporting base and in cooperation with the retractable pin. The auxiliary centering element has the function of centering the generating tool with respect to the retractable pin before the cycle is started, and therefore it allows for positioning of the generating tool in the correct angular position with respect to the sprocket wheel to be worked.

BRIEF DESCRIPTION OF THE SEVERAL VIEWS OF THE DRAWINGS

For a better understanding of the invention, and to show how the same may be carried into effect, reference will now be made, by way of example, to the accompanying drawings, in which:

FIG. 1 shows a diagram of an assembly for use in making double-toothing sprocket wheels which embodies the invention;

FIG. 3 shows a lengthwise section of the cantering device of the assembly of FIG. 1;

FIG. 5 shows a variant of the arrangement of the preceding figures; and

DETAILED DESCRIPTION OF THE INVENTION

Figure 2:
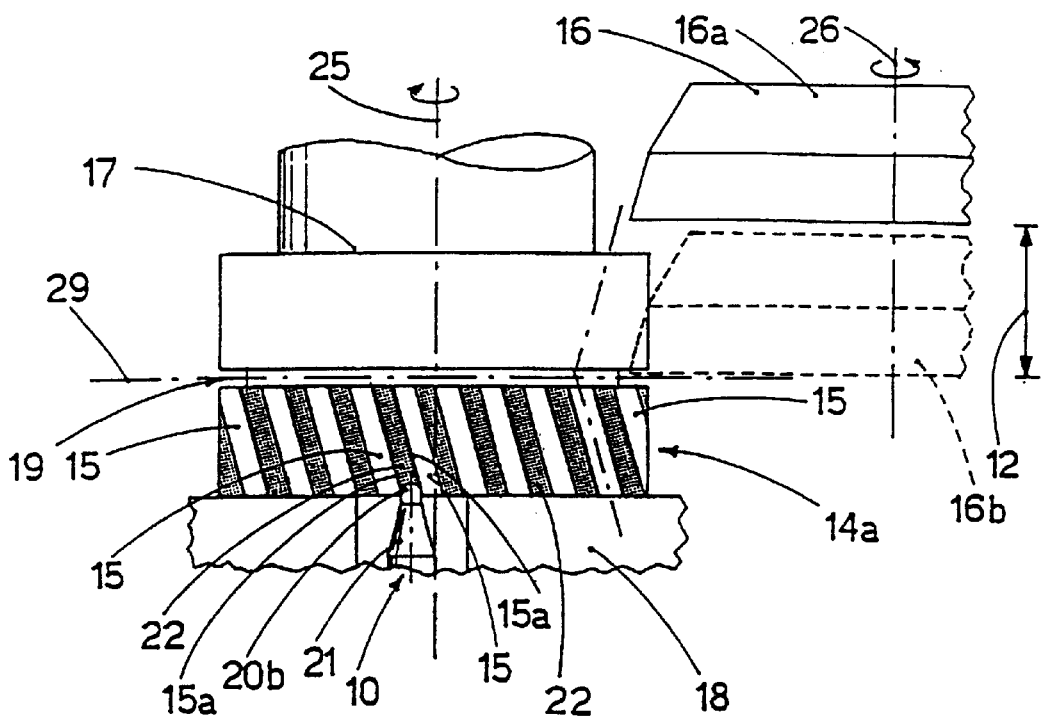
FIG. 2 shows a detail of FIG. 1 from a direction "A"

With reference to the attached figures the reference number 10 denotes generally a centering device comprised by apparatus embodying the invention for producing double-toothing sprocket wheels 11.

In the embodiment shown here we shall describe the situation of sprocket wheels 11 with a bi-helical toothing and cooperating with a supporting surface of a workpiece-bearing table which is substantially horizontal and with a clamping shaft which passes through the hollow sprocket wheel.

The production of sprocket wheels with a straight double-toothing, or of double-toothing pulleys for drive belts, or workpiece-bearing tables which are vertical or in any case inclined to the horizontal are all situations which are to be considered equivalent.

The bi-helical sprocket wheels 11 comprise two different rings, the first ring 14a and the second ring 14b, of teeth 15 being inclined at a desired angle, but opposite, with respect to the median plane 29.

The rings 14a, 14b are separated from each other by a central groove 19.

The centering device 10 is used in association with an assembly to position and center the workpieces 13, in order to determine the correct positioning of the workpieces 13 to obtain the desired angular positions between the rings 14a, 14b of the teeth 15.

To be more exact, the centering device 10 cooperates with a pinion instrument 16 in order to place the second ring 14b in the desired position with respect to the first ring 14a.

The pinion instrument 16, which has teeth which reproduce the teeth 15 to be made on the workpieces 13, works by generation and moves to-and-fro (from 16a to 16b and vice versa) and along a travel path 12, which passes through the central groove 19 parallel to the axis of rotation 25 of the workpiece 13.

The two axes 26-25 (of the pinion instrument 16 and the workpiece 13) progressively approach one another (each of them being in motion) until they define the desired depth of the teeth 15.

The centering device 10 is put in a pre-set position with respect to the plane where the axis 25 joins the axis 26 of the pinion instrument 16 in its start-of-work position.

In the embodiment shown here, the positioning and centering assembly comprises a supporting base 18 or workpiece-bearing table; the workpiece 13 is placed on the supporting surface 18b thereof.

The supporting base 18 has a coupling cavity 18a entered from above by a shaft 17, which positions and clamps the workpiece 13 to the base 18, while centering the shaft 17. The base 18 enables the workpiece 13, and also possibly the shaft 17, to rotate.

The centering device 10 is radially displaceable with respect to the base 18 and is mounted, in this case, on a slider which slides on a guide 24 which is formed radially in and with respect to the base 18.

The centering device 10 comprises a main body 21 inside which a retractable pin 20 is resiliently constrained; the upper part of the retractable pin 20 is spherical in order to make the reciprocal positioning between the centering device 10 and the workpiece 13 more precise.

The retractable pin 20 may assume at least a first position, or waiting position, 20a wherein it is arranged in a high position above the plane lab, and a second position, or operating position, 20b when it has entered a groove 22 between two teeth 15, protruding, for this purpose as much as necessary from the surface 18b.

In this case, the retractable pin 20 is associated with spring means 27 of the cup type, housed inside the main body 21.

The retractable pin 20 is of a replaceable type and its spherical part mates with the transverse sides of the grooves 22 between two successive teeth 15.

Moreover, the retractable pin 20 is made of a material of great hardness and strength, at least in its upper part.

According to the invention, the upper part of the workpiece 13 is always worked on by the pinion instrument 16; therefore, after the first ring 14a has been formed, the same workpiece 13 is transferred to another machine arranging the first ring 14a on the surface of 18b of the supporting base 18. The workpiece 13 is moreover positioned in such a way as to align one of the grooves 22 with the retractable pin 20.

When the axial positioning and clamping shaft 17 is lowered to clamp the workpiece 13 onto the surface 18b, the pin 20 assumes its operating position 20b, and is inserted inside the groove 22 in a substantially median position.

Figure 4:
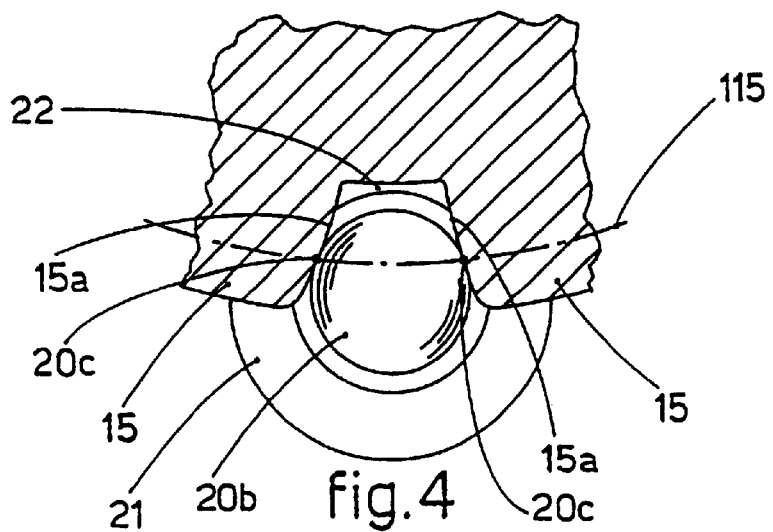
FIG. 4 shows a detail of the operating position of a retractable pin with respect to the sprocket wheel.

Although not essential in the case of FIG. 4, the spherical end of the retractable pin 20 is shaped with respect to the groove 22 in such a way that the points of contact 20c with the walls of the teeth 15 lie on the pitch circle 115.

The retractable pin 20 comes into contact with the side walls 15a of the teeth 15 between which it is inserted, and causes a possible adjustment rotation and a consequent centering of the workpiece 13 with respect to the axis 25, and therefore the correct positioning with respect to the start-of-work position 16a of the pinion instrument 16.

The pre-set positioning of the centering device 10, and therefore of the retractable pin 20 according to the desired angular positioning of the first ring 14a and the second ring 14b, guarantee the precise positioning of the workpiece 13 with respect to the pinion instrument 16 which thus is found to be, in the start-of-work position 16a, already correctly arranged to begin working on the second ring 14b.

When a workpiece 13 of a greater or lesser diameter is being worked, the centering device 10 is radially displaced with respect to the shaft 17 by moving the slider 23, on which the shaft is mounted, along the guide 24.

The supporting base 18 includes grooves 28, which can extend in any direction or orientation whatsoever, which facilitate the removal of the sprocket wheel 11 once its forming is complete, by reducing the adhesion of the workpiece to the workpiece-bearing table resulting from the surface tension of the cutting liquid.

In the case of FIG. 5, instead of the retractable pin 20 entering a groove 22 between two teeth 15, there is a fork-type pin 120, resiliently mounted using spring means 127, which cooperates with a main body 121 and includes two spherical elements 30 which cooperate with the sides of a tooth 15 in order to center the sprocket wheel 11 itself. The fork-type pin 120 has a waiting position 120 (not shown) and an operating position 120b.

Figure 6:
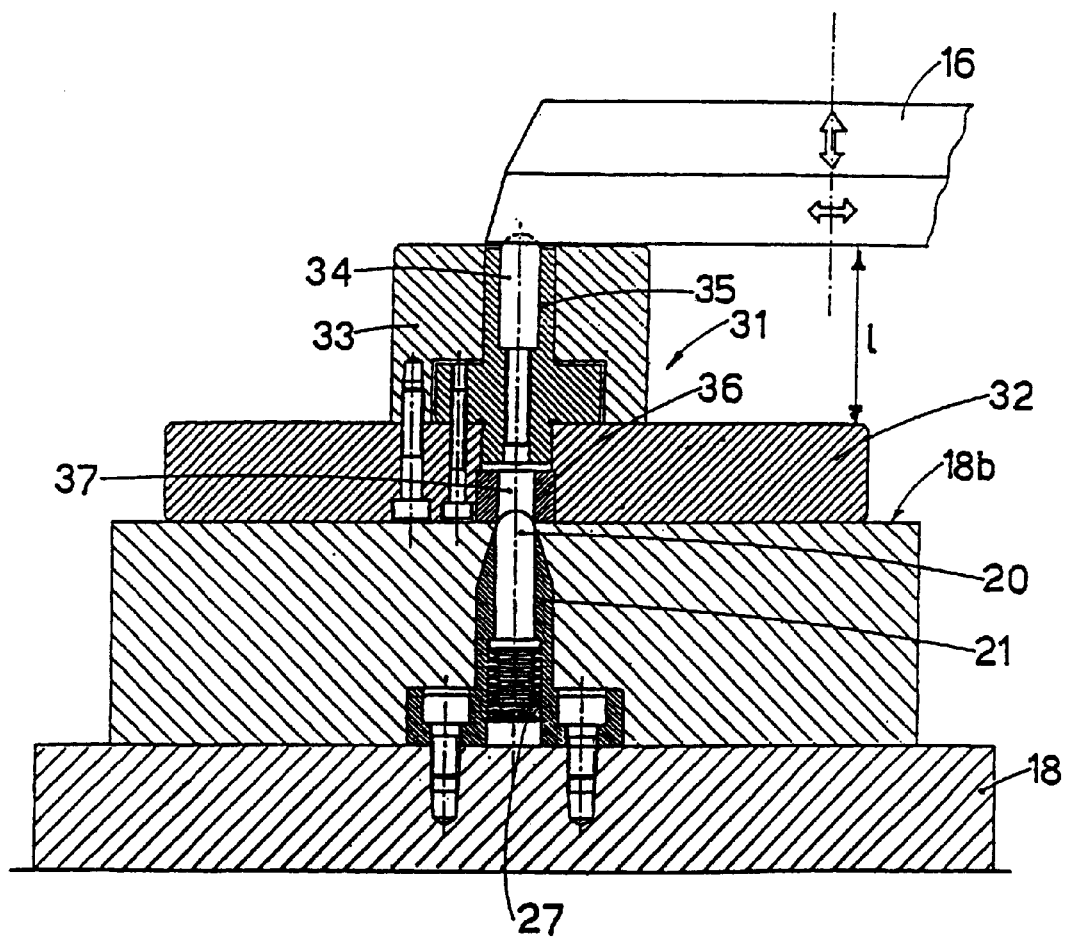
FIG. 6 shows a further variant of the arrangement.

In the variant shown in FIG. 6, the centering device 10 comprises an auxiliary centering element 31 which is used in the initial equipping and setting-up of the tool 16.

The auxiliary centering element 31 consists of a plate 32, suitable for having the base 18 rest thereon, to which a block 33 is attached; the block 33 contains inside a retractable pin 34 equipped with a protruding head, round in shape, advantageously spherical.

The retractable pin 34 is housed inside a housing 35, set within the block 33, inside which it is able to slide vertically, for example resiliently supported and having a short defined section.

With the auxiliary centering element 31 in the working position, the retractable pin 34, is arranged in an axial extension of the retractable pin 20 inserted inside the base 18.

Under the containing body 35, at a substantially central position of the plate 32, there is a hollow bush 36 with an axial hole 37 which is able to cooperate with the head of the retractable pin 20.

The height of the base 18 of the plate 32 plus the block 33 corresponds substantially to the height "1" of the tool 16 taken from the base 18 itself.

During the setting-up step, before the workpiece 13 is arranged on the base 18 and working begins, the auxiliary centering element 31 is positioned on and clamped to the base 18 making the head of the retractable pin 20 cooperate with the axial hole 37 of a bush 36 inserted in the plate 32.

Then, the tool 16 is displaced radially into proximity with the auxiliary centering element 31 until one of the grooves defined between its teeth comes into contact with the protruding head of the retractable pin 34, with a consequent rotation of the tool 16 being carried out to adjust the angle thereof.

Then, when its correct angular position has been fixed, the tool 16 is retracted, the auxiliary centering element 31 is discharged from the base 18 and in its place the workpiece 13 on which the second ring of teeth has to be made is positioned, with a consequent centering of the workpiece 13 with respect to the retractable pin 20.

Due to the axial alignment of the retractable pin 20 and the retractable pin 34, the tool 16 is already in the precise angular position without needing any further adjustments to its position with respect to the workpiece 13.

What is claimed is:

1. Supporting device for use in generating the second ring of a sprocket wheel or pulley wheel (11), having a first ring (14a) which is already formed and a second ring (14b) which has yet to be formed, the rings (14a, 14b) being separated by a central groove (19), each ring (14a, 14b), when finished including respective teeth (15) which are straight or are inclined from 2° to 60° with respect to a median plane (29) orthogonal to the axis (25) of the sprocket wheel (11), said supporting device being associated in use, with a generating blade or pinion instrument (16) which is to move in a to-and-fro movement in relation to an axis (26) thereof located parallel to the axis of rotation (25) of the sprocket wheel or pulley wheel (25), and travel from a first position outside the ring (14a, 14b) to a second position coordinated with the central groove (19), the supporting base (18) having a supporting surface (18b) for receiving thereon a workpiece (13) providing said rings (14a, 14b), a shaft (17) to axially position and clamp the workpiece (13) from which the sprocket wheel or pulley wheel (11) is to be generated as the generating blade or pinion instrument (16) undergoes said travel and a centering device, characterised in that the centering device comprises a retractable pin (20, 120) incorporated in the base (18) to protrude therefrom, being mounted so that it can be in a first, waiting position (20a, 120a) and a second operating position (20b, 120b), the pin (20, 120) in the first waiting position (20a, 120a) being for cooperating during the positioning of the workpiece (13) with at least a tooth of the first ring (14a), the second operating position (20b, 120b) of the retractable pin then defining the angular position of the workpiece (13) clamped on the rotary supporting base (18), the angular position being functionally correlatable, in use, to a plane common to it, the axis (25) of the sprocket wheel or pulley wheel (11) and the axis (26) of the generating blade or pinion instrument (16).

2. Device as in claim 1, characterised in that the retractable pin (20), when in its second operating position (20b), cooperates with a groove (22) between two teeth (15).

3. Device as in claim 1, characterised in that the retractable pin (20) when in its second operating position (120b), cooperates with the sides of a tooth (15).

4. Device as in claim 2, characterised in that, retractable pin (20, 120), when in its second operating position (20b, 120b), has points of contact with the walls of the teeth (15) lying on the pitch circle (115) of the first ring (14a) positioned therebelow.

5. Device, as in claim 1, characterised in that the retractable pin (20, 120) includes a position which can be radially adjusted with respect to the axis of rotation (25) of the supporting base (18).

6. Device as in claim 5, characterised in that the retractable pin (20, 120) is mounted on slider means (23) which is radially movable with respect to the axis of rotation (25) of the supporting base (18).

7. Device as in claim 1, characterised in that the retractable pin (20, 120) has a spherical contact surface.

8. Device as in claim 1, characterised in that at least the contact end of the retractable pin (20, 120) is made of a hard, strong material.

9. Device as in claim 1, characterised in that the retractable pin (20, 120) has resilient support means (27, 127) by which it is axially supported.

10. Device as in claim 1, characterised in that the retractable pin (20, 120) has its longitudinal axis substantially parallel to the axis of rotation (25) of the supporting base (18).

11. Device as in claim 1, characterised in that the retractable pin (20,120) has its axis substantially orthogonal to the axis of rotation (25) of the supporting base (18).

12. Device as in claim 1, wherein grooves (28) or hollows are present on the surface (18b) of the supporting base (18) to facilitate extraction of the workpiece.

13. Device as in claim 1, characterised in that it comprises an auxiliary centering element (31) able to position and angularly center the tool (16) with respect to the workpiece (13) before the work cycle is started by the supporting blade or pinion instrument (16) itself.

14. Device as in claim 13, characterised in that the auxiliary centering element (31) comprises a retractable pin (34) assembled on support means (32,33), the support means (32,33) being equipped at its base with a hole (37) which cooperates with the head of the retractable pin (20) so as to clamp the auxiliary centering element (31) in position to the base (18), the retractable pin (34) being axially aligned with the retractable pin (20) and including at least a position wherein it protrudes above the support means (32,33) and cooperates with one of the teeth of the tool (16) so as to angularly center the supporting blade or pinion instrument (16) with respect to the workpiece (13).

15. Method for generating the second ring of a sprocket wheel or pulley wheel (11) having a first ring (14a) which is already formed and a second ring (14b) which has yet to be formed, the rings (14a, 14b) being separated by a central groove (19) so that both rings of the finished sprocket wheel or pulley wheel include respective teeth (15) which are straight or are inclined from 2° to 60° with respect to a median plane (29) orthogonal to the axis (25) of the sprocket wheel (11), in which method, a workpiece (13) having the rings (14a, 14b) is placed on a supporting base (18) having a supporting surface (18b), the workpiece (13) is axially positioned and clamped on a shaft (17) and the workpiece (13) is centered prior to its being subjected to the action of a generating blade or pinion instrument (16) which is moved in a to-and-fro movement in relation to an axis (26) thereof which is located parallel the axis of rotation (25) of the sprocket wheel or pulley wheel, the generating blade or pinion instrument (16) travelling from a first position outside the workpiece (13) to a second position coordinated with the central groove (19), characterised in that the centering is achieved by means of a retractable pin (20,120) housed in the base (18) and protruding from the base, the retractable pin (20,120) being mounted so that it is initially in a first, waiting position (20a,120a) and assumes a second operating position (20b),120b) when the workpiece (13) is placed thereover when the pin (20,120) is caused to cooperate with at least a tooth of the first ring (14a) to define the angular position of the workpiece (13) with respect to a plane common to it, the axis (25) of the sprocket wheel or pulley wheel (11) and the axis (26) of the generating blade or pinion instrument (16).

16. Method as in claim 15, characterised in that the activation of the axial positioning and clamping shaft (17) causes the retractable pin (20, 120) to be inserted in such a way that the retractable pin (20, 120) cooperates with the walls of the teeth (15) defining the groove (22).

17. Method as in claim 15, characterised by including a preliminary step of positioning and angularly centering the generating blade or pinion instrument (16) with respect to the workpiece (13) before the start of the work cycle of the generating blade or pinion instrument (16), the preliminary step of positioning and angularly centering the tool (16) being performed by an auxiliary centering element (31) which includes a retractable pin (34) which is axially aligned with the retractable pin (20) and cooperates with a groove defined between teeth of the tool (16).

* * * * *